United States Patent Office 3,509,178
Patented Apr. 28, 1970

3,509,178
DIBENZOFURAN ACETOHYDROXAMIC ACID
Samuel S. M. Wang, Indianapolis, Ind., assignor to The Dow Chemical Company, Midland, Mich., a corporation of Delaware
No Drawing. Filed Jan. 5, 1968, Ser. No. 695,838
Int. Cl. C07d 5/44
U.S. Cl. 260—346.2                                              1 Claim

ABSTRACT OF THE DISCLOSURE 2-dibenzofuran acetohydroxamic acid is prepared by the reaction of 2-dibenzofuran acetyl chloride with hydroxylamine hydrochloride in the presence of a hydrogen chloride acceptor. The novel compound is useful as an anti-inflammatory agent.

SUMMARY OF THE INVENTION

This invention relates to acetohydroxamic acids and is particularly directed to 2-dibenzofuran acetohydroxamic acid.

The 2-dibenzofuran acetohydroxamic acid of the invention is a crystalline solid which is of varying degrees of solubility in organic solvents such as benzene, acetone and alcohols and which is slightly soluble in water. The compound is useful for administration to animals for the alleviation of symptoms of inflammation. In standard tests, it has been found to be useful as an anti-inflammatory agent, as illustrated by its reduction of carrageenin-induced edema in small animals.

The compound of the invention is prepared by the reaction of 2-dibenzofuran acetyl chloride with hydroxylamine hydrochloride in the presence of a hydrogen chloride acceptor. Suitable hydrogen chloride acceptors include pyridine, triethylamine or aqueous solutions of alkali metal hydroxides such as dilute aqueous sodium hydroxide or potassium hydroxide. The reaction proceeds when the reactants are contacted and mixed, preferably in an inert organic solvent such as benzene or toluene as a reaction medium. The reaction proceeds at temperatures from about 10° to about 50° C. and is preferably carried out at a temperature of about 45° C. During the reaction period, it is desirable to maintain the reaction mixture at a temperature below 50° C. in order to prevent side reactions from going forward with consequent reduction in the yield of the desired product. The product is separated from the reaction mixture by evaporation in vacuo to remove the solvents and by thereafter mixing the residue with dilute aqueous acid such as hydrochloric acid. The acidic aqueous mixture is then filtered and the product is collected as a filter cake. The 2-dibenzofuran acetohydroxamic acid product can be purified by conventional procedures such as recrystallization and washing.

The 2-dibenzofuran acetyl chloride employed as a starting material can be conveniently prepared by the reaction of 2-dibenzofuran acetic acid with thionyl chloride. In a convenient procedure, 2-dibenzofuran acetic acid is mixed with excess thionyl chloride and pyridine. Unreacted thionyl chloride and the pyridine solvent can be removed by conventional procedures such as evaporation.

In a convenient procedure for the preparation of the 2-dibenzofuran acetohydroxamic acid of the invention, 2-dibenzofuran acetyl chloride, hydroxylamine hydrochloride and a hydrogen chloride acceptor are mixed together in any order or fashion. The exact proportions of the reactants to be employed are not critical, some of the desired product being obtained when the reactants are employed in any proportions; however, one molar proportion of dibenzofuran acetyl chloride reacts with one molar proportion of hydroxylamine hydrochloride and the reactants are preferably employed in such proportions. The reaction proceeds with the production of two molar proportions of hydrogen chloride for each molar proportion of starting material consumed. Consequently, at least two molar proportions of the hydrogen chloride acceptor are employed for each molar proportion of 2-dibenzofuran acetyl chloride or hydroxylamine hydrochloride starting material, and the use of an excess of the hydrogen chloride acceptor is preferred. The mixture of reactants, hydrogen chloride acceptor and inert organic solvent are heated at a temperature within the reaction temperature range for a period from about 0.5 to about 4 hours. The inert organic solvent is then removed by distillation in vacuo and the residue is acidified by the addition of aqueous hydrochloric acid. The aqueous acidic mixture is filtered and the product is collected as a filter cake. The product can be purified by conventional procedures such as recrystallization from lower alcohol.

DESCRIPTION OF THE PREFERRED EMBODIMENT

In a representative operation, 2-dibenzofuran acetyl chloride (12.2 grams; 0.05 mole) was dissolved in 80 milliliters of anhydrous benzene. Hydroxylamine hydrochloride (3.7 grams; 0.05 mole) was mixed with 100 milliliters of water and 68 milliliters of aqueous 10 percent sodium hydroxide solution. The solution of the 2-dibenzofuran acetyl chloride and benzene was then added to the aqueous mixture with stirring and the resulting mixture was stirred for one hour. During the reaction period, the temperature of the reaction mixture was maintained between 25° and 50° C. The mixture was then distilled under vacuum to remove the benzene solvent and the residual solution was acidified by the addition of aqueous 10 percent hydrochloric acid solution. The acidic mixture was filtered. The 2-dibenzofuran acetohydroxamic acid was collected as a filter cake, recrystallized three times from ethanol and found to melt at 176°-177° C. The product was found by analysis to have carbon, hydrogen and nitrogen contents of 69.5, 4.5 and 5.8 percent, respectively, as compared with the theoretical contents of 69.7, 4.6 and 5.8 percent, respectively, calculated for the named structure. The structure of the product was confirmed by infrared spectroscopy.

The compound of the invention can be administered to animals by conventional procedures for the alleviation of inflammation. It can be employed as the active anti-inflammatory ingredient in compositions comprising the 2-dibenzofuran acetohydroxamic acid in admixture with known pharmaceutical carriers, including inert diluents, binders, lubricants, suspending agents, dispersing agents, preservatives, flavors and the like. It can be administered orally in the form of tablets, capsules, suspensions, emulsions or the like. The novel compound can also be formulated in sterile injectable compositions for administration by subcutaneous or intraperitoneal injection or the like.

2-dibenzofuran acetohydroxamic acid has been found to be useful as an anti-inflammatory agent as indicated by its activity in standard pharmacological tests for the reduction of carrageenin-induced edema. In representative operations, reductions in carrageenin-induced edema in separate groups of rats of 21, 28 and 38 percent were observed when 2-dibenzofuran acetohydroxamic acid was administered orally at dosages of 50, 100 and 200 milligrams per kilogram, respectively.

I claim:
1. 2-dibenzofuran acetohydroxamic acid.

References Cited
UNITED STATES PATENTS
2,648,684  8/1953  Wenner _____ 260—346.2

ALEX MAZEL, Primary Examiner
B. I. DENTZ, Assistant Examiner

U.S. Cl. X.R.
424—285